(12) United States Patent
Simon et al.

(10) Patent No.: US 9,990,853 B1
(45) Date of Patent: Jun. 5, 2018

(54) MATERIAL DETECTION ON A ROAD

(71) Applicant: Lockheed Martin Corporation, Bethesda, MD (US)

(72) Inventors: David E. Simon, Lewisville, TX (US); John A. Haddon, Centennial, CO (US); Dale D. Rowley, Highlands Ranch, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 85 days.

(21) Appl. No.: 15/058,801

(22) Filed: Mar. 2, 2016

(51) Int. Cl.
| G08G 1/01 | (2006.01) |
| G08G 1/16 | (2006.01) |
| G01S 17/06 | (2006.01) |
| G01S 13/06 | (2006.01) |
| G01S 7/00 | (2006.01) |

(52) U.S. Cl.
CPC ........... *G08G 1/165* (2013.01); *G01S 7/003* (2013.01); *G01S 13/06* (2013.01); *G01S 17/06* (2013.01)

(58) Field of Classification Search
CPC ................................. G01S 13/89; G01S 17/89
See application file for complete search history.

(56) References Cited

U.S. PATENT DOCUMENTS

| 7,935,389 | B2 * | 5/2011 | Takahashi | B41J 11/009 118/666 |
| 8,818,609 | B1 * | 8/2014 | Boyko | B60W 30/00 342/70 |
| 9,097,800 | B1 * | 8/2015 | Zhu | G01S 13/865 |
| 2001/0039804 | A1 * | 11/2001 | Newman | F25C 5/10 62/66 |
| 2010/0007500 | A1 * | 1/2010 | Mestres | G06Q 10/08 340/572.4 |
| 2010/0153078 | A1 * | 6/2010 | Zhang | G06T 13/60 703/2 |
| 2011/0044507 | A1 * | 2/2011 | Strauss | B60R 21/0134 382/103 |

(Continued)

OTHER PUBLICATIONS

The National Institute for Occupational Safety and Health (NIOSH), Engineering Considerations and Selection Criteria for Proximity Warning Systems for Mining Operations, CDC, 2012 https://web.archive.org/web/20130201194255/http://www.cdc.gov/niosh/mining/index.html.*

*Primary Examiner* — Ryan Rink
(74) *Attorney, Agent, or Firm* — Withrow & Terranova, PLLC (57) ABSTRACT

A material detection system mountable to a ground vehicle. The material detection system includes a first range determination system (RDS) that includes a first electromagnetic radiation (EMR) emitter configured to emit first EMR behind the ground vehicle within a first field of view (FOV), a first EMR receiver that is configured to receive first EMR reflections, and a first RDS processing device configured to generate first RDS data that identifies distances to reflective surfaces based on the first EMR reflections. A processing device is coupled to the first range determination system and is configured to determine, based at least in part on the first RDS data, that material exists on the road. The processing device is also configured to determine a location of the material, and cause the location to be communicated to a computing device that maintains a map that identifies locations of material larger than a predetermined threshold.

20 Claims, 10 Drawing Sheets

(56) References Cited

U.S. PATENT DOCUMENTS

| | | | |
|---|---|---|---|
| 2013/0222127 A1* | 8/2013 | Ray Avalani | B60Q 9/008 340/436 |
| 2014/0152470 A1* | 6/2014 | Abuelsaad | G08G 1/0967 340/905 |
| 2015/0177736 A1* | 6/2015 | Anderson | G05D 1/0274 701/25 |
| 2015/0179066 A1* | 6/2015 | Rider | G08G 1/04 701/31.5 |
| 2015/0325005 A1* | 11/2015 | Hayakawa | G06T 7/254 348/148 |
| 2017/0045611 A1* | 2/2017 | Gunzel | G01S 15/931 |

* cited by examiner

MATERIAL DETECTION ON A ROAD

TECHNICAL FIELD

The embodiments relate generally to detecting materials on a road, and in particular to detecting materials that have fallen on a road from a vehicle, such as a mining vehicle.

BACKGROUND

Mining operations utilize vehicles that use relatively costly tires. Some mining vehicle tires cost in excess of $100,000 per tire. Unfortunately, relatively small debris in the road can ruin such a tire. Because the nature of mining involves the movement of raw material of various sizes and shapes, it is not uncommon for some of the raw material to fall from a mining vehicle onto a road. At a later point in time, another mining vehicle may inadvertently run over the debris, and cause damage to a tire. Debris in the road is even more problematic in the context of mining operations where no human is involved in driving the mining vehicle.

Attempts to mitigate this problem include the use of a forward looking light detection and ranging (LIDAR) system that scans the road in front of the mining vehicle. In order to give the mining vehicle sufficient time to alter its course, the LIDAR system is directed relatively far ahead of the vehicle, requiring a relatively high-resolution LIDAR system. High-resolution LIDAR systems are relatively expensive, and current attempts at systems utilizing such LIDAR have difficulty distinguishing problematic debris from non-problematic debris due to the distance in front of the vehicle that must be analyzed in order to give the vehicle sufficient time to alter its course to avoid the debris.

SUMMARY

The embodiments relate to material detection on a road used by a plurality of ground vehicles. In one embodiment, the ground vehicles are mining vehicles used to haul material from one location to another location. Generally the embodiments include a rearward facing material detection system that detects materials that may have fallen from a ground vehicle in the road behind the ground vehicle. The embodiments cause the location of the material to be communicated to a computing device that maintains a master map of the location of such material on the roads. The computing device provides the master map to the plurality of ground vehicles so that the ground vehicles know of the locations of material in the road and can avoid the material and thereby avoid tire damage.

In one embodiment, a material detection system is provided. The material detection system is mountable to a ground vehicle and includes a first range determination system (RDS). The first RDS includes a first electromagnetic radiation (EMR) emitter that is configured to emit first EMR behind the ground vehicle within a first field of view (FOV). The first RDS also includes a first EMR receiver that is configured to receive first EMR reflections of the first EMR, and a first RDS processing device that is configured to generate first RDS data that identifies distances to reflective surfaces within the first FOV based on the first EMR reflections. The material detection system also includes a processing device that is coupled to the first RDS and that is configured to determine, based at least in part on the first RDS data, that material exists on the road. The processing device is also configured to determine a location of the material and cause the location of the material to be communicated to a computing device that maintains a map that identifies locations of material larger than a predetermined threshold.

In one embodiment, the first EMR emitter is configured to emit the first EMR in a plane that is substantially parallel to the earth.

In one embodiment, the first RDS comprises a plurality of EMR emitters including the first EMR emitter, and the plurality of EMR emitters are configured to emit EMR in a plurality of different planes, the plurality of different planes centered about a central plane that is substantially parallel to the earth.

In one embodiment, the material detection system includes a second RDS having a second FOV. The second range determination system includes a second EMR emitter that is configured to emit second EMR toward the earth behind the ground vehicle, a second EMR receiver configured to receive second EMR reflections of the second EMR, and a second RDS processing device configured to generate second RDS data that identifies distances to reflective surfaces based on the second EMR reflections.

In one embodiment, the first EMR is emitted toward a road behind the ground vehicle.

In one embodiment, the first EMR is emitted at an angle between about 30 degrees and about 60 degrees with respect to a line perpendicular to the road.

In one embodiment, the first RDS comprises a light detection and ranging (LIDAR) system or a radio detection and ranging (RADAR) system.

In one embodiment, the processing device is further configured to determine, based on the first RDS data, that the material is larger than the predetermined threshold.

In another embodiment, a ground vehicle is provided. The ground vehicle includes a material detection system. The material detection system includes a first RDS. The first RDS includes a first EMR emitter that is configured to emit first EMR behind the ground vehicle within a first FOV. The first RDS also includes a first EMR receiver that is configured to receive first EMR reflections of the first EMR, and a first RDS processing device that is configured to generate first RDS data that identifies distances to reflective surfaces within the first FOV based on the first EMR reflections. The material detection system also includes a processing device that is coupled to the first RDS and that is configured to determine, based at least in part on the first RDS data, that material exists on a road. The processing device is also configured to determine a location of the material, and cause the location of the material to be communicated to a computing device that maintains a map that identifies locations of material larger than a predetermined threshold.

In another embodiment, a method is provided. The method includes emitting first electromagnetic radiation (EMR) within a first FOV behind a ground vehicle, receiving first EMR reflections of the first EMR. The method further includes generating first RDS data that identifies distances to reflective surfaces within the first FOV based on the first EMR reflections. The method further includes determining, based at least in part on the first RDS data, that material exists on a road. The method further includes determining a location of the material, and causing the location of the material to be communicated to a computing device that maintains a map that identifies locations of material larger than a predetermined threshold.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first range determination system" and "second range determination system," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

The embodiments relate to material detection on a road used by a plurality of ground vehicles to move material. In one embodiment, the ground vehicles are mining vehicles used to haul material from one location to another location. Generally, the embodiments include a rearward facing material detection system mounted to a ground vehicle that detects materials that may have fallen from the ground vehicle to the road behind the ground vehicle. The embodiments cause the location of the material to be communicated to a computing device that maintains a master map of locations of such material on the roads. The computing device provides the master map to the plurality of ground vehicles so that the ground vehicles know of the locations of material in the road and can avoid the material and thereby avoid tire damage.

Figure 1:
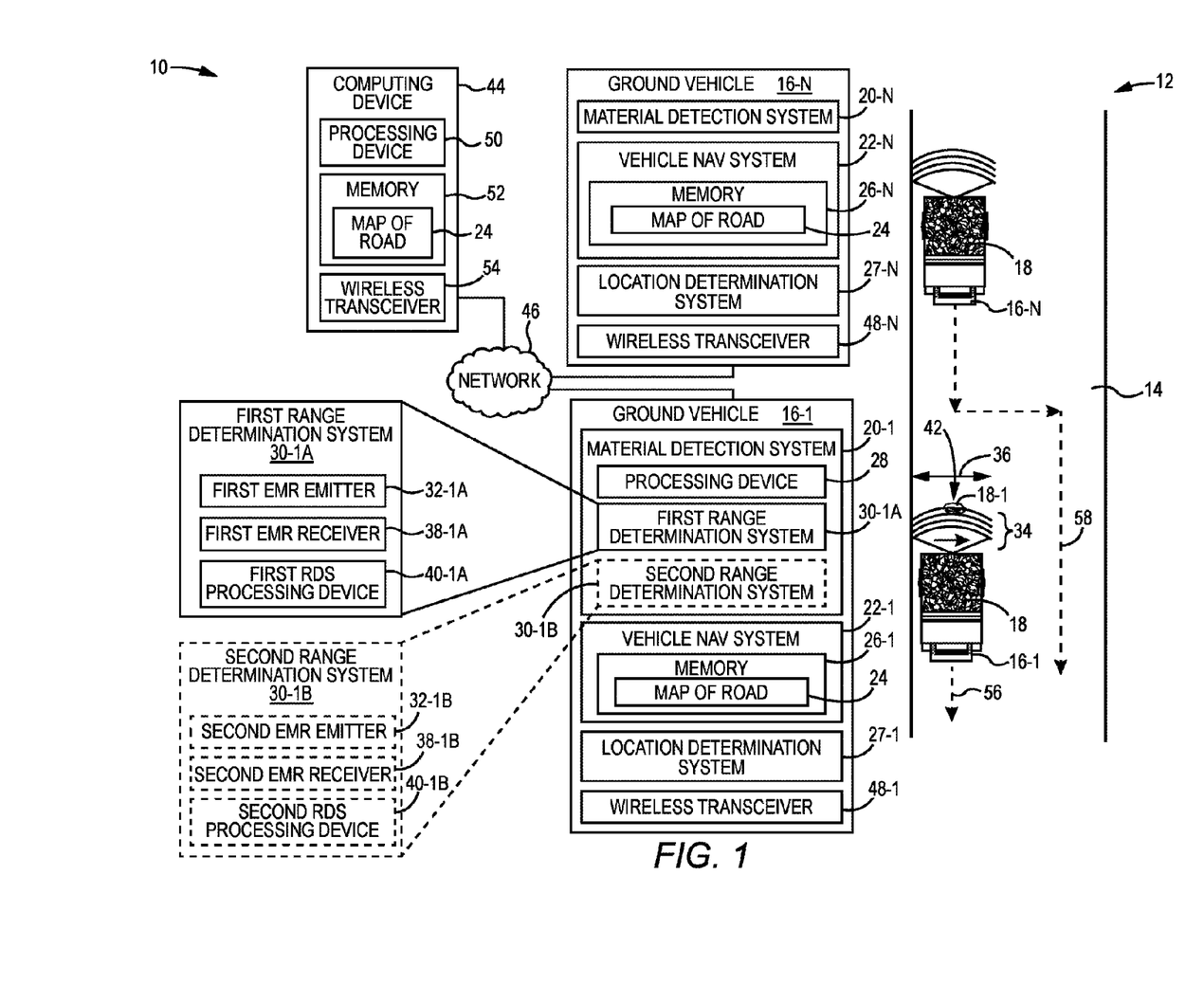
FIG. 1 is a block diagram of a system in which embodiments may be practiced.

FIG. 1 is a block diagram of a system 10 in which embodiments may be practiced. The embodiments will be discussed herein in the context of a mine 12 which includes a plurality of roads 14 (only one illustrated), but the embodiments are not limited to mining operations and have utility in any application where it is desirable to determine if something has fallen from a ground vehicle. The system 10 includes a plurality of ground vehicles 16-1-16-N (generally, ground vehicles 16). In this embodiment, the ground vehicles 16 comprise self-driving mining vehicles that transport material 18 from one location in the mine 12 to another location in the mine 12, but the embodiments are not limited to self-driving mining vehicles.

The ground vehicle 16-1 includes a material detection system 20-1 configured to detect material on the road 14. The ground vehicle 16-1 also includes a vehicle navigation system 22-1 that is configured to navigate the ground vehicle 16-1 about the mine 12 based on a map 24 maintained in a memory 26-1. The map 24 identifies the roads 14 in the mine 12, as well as the material 18 in the road 14 which has been identified by one or more ground vehicles 16. The vehicle navigation system 22-1 uses the map 24 to navigate the ground vehicle 16-1 around such material 18 to avoid damage to tires of the ground vehicle 16-1. The vehicle navigation system 22-1 may use a location determination system 27-1 to determine a current location of the ground vehicle 16-1. The location determination system 27-1 may comprise, for example, a global positioning system.

The material detection system 20-1 includes a processing device 28, such as a general purpose or special purpose processor or micro-processor. The material detection system 20-1 also includes a first range determination system (RDS) 30-1A. The first RDS 30-1A includes a first electromagnetic radiation (EMR) emitter 32-1A that is configured to emit first EMR 34 behind the ground vehicle 16-1 within a first field of view (FOV) 36. In one embodiment, the first EMR emitter 32-1A comprises a light detection and ranging (LIDAR) system that emits EMR in the form of a laser beam in one or more wavelengths utilized by LIDAR systems. In another embodiment, the first EMR emitter 32-1A comprises a radio detection and ranging (RADAR) that emits the first EMR 34 in one or more wavelengths utilized by RADAR systems. The first RDS 30-1A includes a first EMR receiver 38-1A configured to receive first EMR reflections of the first EMR 34. The first RDS 30-1A includes a first RDS processing device 40-1A that is configured to generate first RDS data that identifies distances to reflective surfaces within the first FOV 36 based on the first EMR reflections.

In some embodiments, the material detection system 20-1 may optionally include a second RDS 30-1B. The second RDS 30-1B includes a second EMR emitter 32-1B that is configured to emit second EMR 34 behind the ground vehicle 16-1 within a second FOV 36. The second RDS 30-1B includes a second EMR receiver 38-1B configured to receive second EMR reflections of the second EMR 34. The second RDS 30-1B includes a second RDS processing device 40-1B that is configured to generate second RDS data that identifies distances to reflective surfaces within the second FOV 36 based on the second EMR reflections.

As will be discussed in greater detail below, the first EMR emitter 32-1A may emit the first EMR 34 in a direction that detects material 18 as the material 18 falls from the ground vehicle 16-1 to the road 14. By way of non-limiting example, the first EMR emitter 32-1A may emit the first EMR 34 in a direction that is substantially parallel to the earth, and the second EMR emitter 32-1B may emit the second EMR 34 at the road 14 behind the ground vehicle 16-1.

The system 10 includes a plurality of other ground vehicles 16, including the ground vehicle 16-N. The ground vehicle 16-N may be similarly configured as the ground vehicle 16-1, and includes a material detection system 20-N configured to detect material 18 on the road 14 behind the ground vehicle 16-N. The ground vehicle 16-N may also include a vehicle navigation system 22-N that is configured to navigate the ground vehicle 16-N about the mine 12 based on the map 24 maintained in a memory 26-N. The vehicle navigation system 22-N may use a location determination system 27-N to determine a current location of the ground vehicle 16-N. The map 24 identifies material 18 in the road 14 which the vehicle navigation system 22-N uses to navigate the ground vehicle 16-N around such material 18 to avoid damage to tires of the ground vehicle 16-N. While for purposes of illustration only two ground vehicles 16 are depicted, the system 10 may include any number of ground vehicles 16 including tens or hundreds of ground vehicles 16, each of which may operate substantially similarly to the ground vehicle 16-1 and 16-N described herein.

The system 10 includes a computing device 44 that is communicatively coupled to the ground vehicles 16 via a network 46. The computing device 44 may reside, for example, at a remote location from the ground vehicles 16. In one embodiment, the network 46 is at least in part a wireless network, and the ground vehicles 16-1, 16-N communicate with the network 46 via respective wireless transceivers 48-1, 48-N. In some embodiments, the network 46 comprises a cellular network, but the embodiments are not limited to any particular type of network. The computing device 44 includes a processing device 50, a memory 52, the map 24, and a wireless transceiver 54 to facilitate communications with the ground vehicles 16 via the network 46.

The map 24 may include all the roads 14 in the mine 12. In some embodiments, the computing device 44 receives, from a ground vehicle 16, a location of material 18, such as material 18-1, in the road 14. The computing device 44 updates the map 24 to identify a location 42 of the material 18-1 in the road 14. The computing device 44 periodically or intermittently provides the map 24 to the ground vehicles 16. The computing device 44 may push the map 24 to the ground vehicles 16 upon, for example, receiving data identifying the location of new material 18 on the road 14. In other embodiments, the ground vehicles 16 may periodically or intermittently request the map 24 from the computing device 44. The ground vehicles 16 then update, or replace, the current copy of the map 24 in the memory 26 with the map 24 received from the computing device 44.

In some embodiments, self-driving or manned cleanup units exist to remove the material 18-1 from the road 14. In such embodiments, the computing device 44 may generate a message identifying the location 42 of the material 18-1 and send the message to the cleanup units. The cleanup units may then travel to the location 42 and remove the material 18-1 from the road 14.

The vehicle navigation systems 22 utilize the map 24 to avoid the material 18-1. For example, assume that the material detection system 20-1 identifies the material 18-1 in the road 14 behind the ground vehicle 16-1 as the ground vehicle 16-1 travels in a direction 56. The material detection system 20-1 causes the location 42 of the material 18-1 to be communicated to the computing device 44. The computing device 44 updates the map 24 in the memory 52 and provides the map 24 via the network 46 to the ground vehicle 16-N, which is also travelling in the direction 56. The vehicle navigation system 22-N receives the map 24 and, based on the map 24, determines that the material 18-1 is at the location 42, which is directly in front of the ground vehicle 16-N. The vehicle navigation system 22-N then determines a new path 58 that avoids the location 42 so that the ground vehicle 16-N does not run over the material 18-1 and damage one or more tires of the ground vehicle 16-N. In the case of self-driving ground vehicles 16, all this described processing is done automatically without human intervention. In the case of ground vehicles 16 that are manned, the vehicle navigation system 22-N may display a warning or other alert to identify the material 18-1 to the operator of the ground vehicle 16-N to allow the operator to alter the path of the ground vehicle 16-N to avoid the material 18-1.

Because the material detection system 20-1 looks behind the ground vehicle 16-1 to identify material 18 that has fallen from a bed of the ground vehicle 16-1, the material detection system 20-1 need not have a substantial range as is otherwise needed if the material detection system 20-1 were directed in the direction of travel of the ground vehicle 16-1. Forward-looking material detection systems require a greater range and resolution so that the moving ground vehicle 16 has time to alter its course to avoid material 18 in front of the ground vehicle 16. Such greater range and resolution material detection systems are expensive and, in practice, often are unable to distinguish material 18 properly, either resulting in route modifications that are not necessary, or in a failure to make a necessary route modification resulting in a damaged tire. In contrast, the embodiments can utilize a lower cost and lower resolution material detection system 20-1 that detects material 18 at a relatively close distance behind the ground vehicle 16-1.

Figure 2:
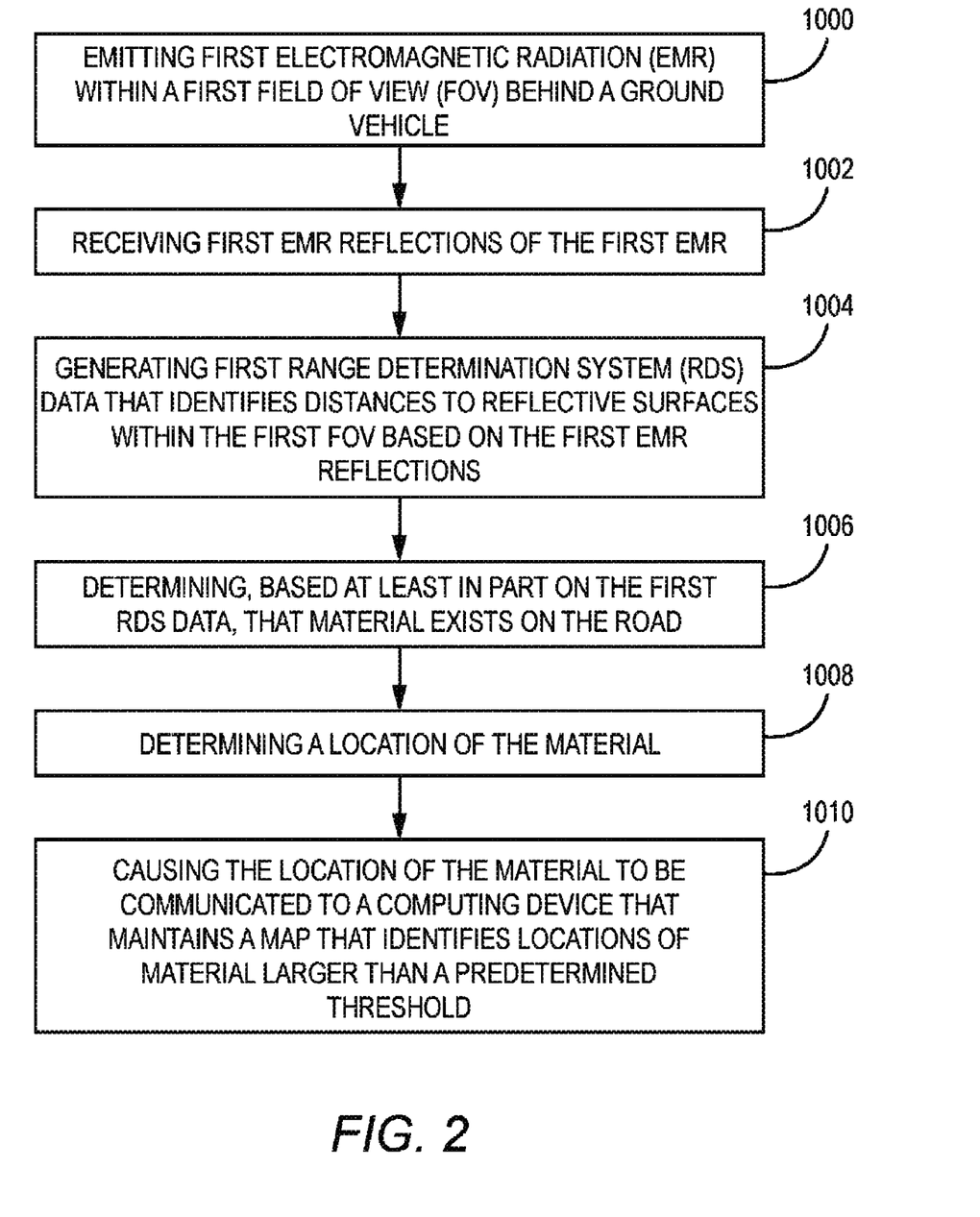
FIG. 2 is a flowchart of a method for detecting a material in a road behind a ground vehicle according to one embodiment.

FIG. 2 is a flowchart of a method for detecting material in a road behind a ground vehicle according to one embodiment. FIG. 2 will be discussed in conjunction with FIG. 1. The first EMR emitter 32-1A emits the first EMR 34 within the first FOV 36 behind the ground vehicle 16-N (FIG. 2, block 1000). The first FOV 36 may have both a horizontal FOV component and a vertical FOV component. The horizontal FOV may extend from one side of the ground vehicle 16-N to another side of the ground vehicle 16-N. In some embodiments, the horizontal FOV may be about 130 degrees. The vertical FOV may be relatively narrow. In some embodiments, as will be discussed in greater detail below, the first RDS 30-1A comprises a plurality of first EMR emitters 32-1A, such as, by way of non-limiting example, four first EMR emitters 32-1A, each of which has a different vertical FOV. The first EMR receiver 38-1A receives first EMR reflections of the first EMR 34 (FIG. 2, block 1002). The first RDS processing device 40-1A generates first RDS data that identifies distances to reflective surfaces within the first FOV 36 based on the first EMR reflections (FIG. 2, block 1004). The processing device 28 determines, based at least in part on the first RDS data, that the material 18-1 exists on the road 14 (FIG. 2, block 1006).

The processing device 28 determines the location 42 of the material 18-1 (FIG. 2, block 1008). In some embodiments, the processing device 28 may determine the location 42 by communicating with the location determination system 27-1 and, in some embodiments, by a velocity of the ground vehicle 16-N. The processing device 28 may also use the distances identified by the first RDS data to pinpoint the location 42.

The processing device 28 causes the location 42 of the material 18-1 to be communicated to the computing device 44 that maintains the map 24 (FIG. 2, block 1010). In one embodiment, the material detection system 20-1 may include a wireless transceiver via which the processing device 28 may communicate the location 42 of the material 18-1 to be communicated to the computing device 44. In other embodiments, the processing device 28 may interact with other systems of the ground vehicle 16-1 to cause the location 42 of the material 18-1 to be communicated to the computing device 44 via the wireless transceiver 48-N.

FIGS. 3A-3D are diagrams illustrating the detection of the material 18-1 falling off the ground vehicle 16-1 according to one embodiment. FIGS. 3A-3D will be discussed in conjunction with FIG. 1. FIGS. 3A-3D depict four consecutive instances in time, and will be discussed together collectively, and in conjunction with FIG. 1. In this embodiment, the material detection system 20-1 includes a first RDS 30-1A that includes four first EMR emitters 32-1A. The plurality of first EMR emitters 32-1A are configured to emit the EMR 34 in the form of a plurality of laser beams 35-1-35-4 on a plurality of different planes 60-1-60-4 (generally, planes 60) behind the ground vehicle 16-1, the plurality of different planes 60 being parallel to or slightly offset from a central plane 62 that is substantially parallel to the earth. The plurality of first EMR emitters 32-1A emits the laser beams 35-1-35-4 on the plurality of different planes 60-1-60-4 by repeatedly sweeping the laser beams 35-1-35-4 across a horizontal FOV. The planes 60 and the laser beams 35-1-35-4 are depicted by four separate dashed lines in FIGS. 3A-3D. Each of the different planes 60 may be within 5-10 degrees of a central plane 62. The material detection system 20-1 may also include four first EMR receivers 38-1A configured to detect first EMR reflections 64 of the EMR 34. In other embodiments, a single first EMR receiver 38-1A may be configured to detect the first EMR reflections 64 of the EMR 34.

In this example, the material 18-1 has fallen from a bed 66 of the ground vehicle 16-1. As the material 18-1 impinges upon the EMR 34, the first EMR reflections 64 are received by the first EMR receiver 38-1A. The first RDS processing device 40-1A provides one or more distances 70 to the processing device 28. Because the distances 70 are indicative of an object relatively close behind the ground vehicle 16-1, and because the relatively close distances 70 occur for only a brief period time during which the material 18-1 passes through the first EMR 34, the processing device 28 may determine that the first EMR reflections 64 identify material 18 that has fallen from the bed 66 of the ground vehicle 16-1. In some embodiments, based on the first RDS data, the processing device 28 may make a determination about the size, volume, or other metric associated with the material 18-1. If the material 18-1 is determined to be below a predetermined threshold, such as smaller than a predetermined size, volume or other metric, the processing device 28 may not communicate the location 42 to the computing device 44. The predetermined threshold may be based on a size, volume or other metric of material known, estimated, or experimentally determined to cause damage to a tire of a ground vehicle 16.

Figure 3A:
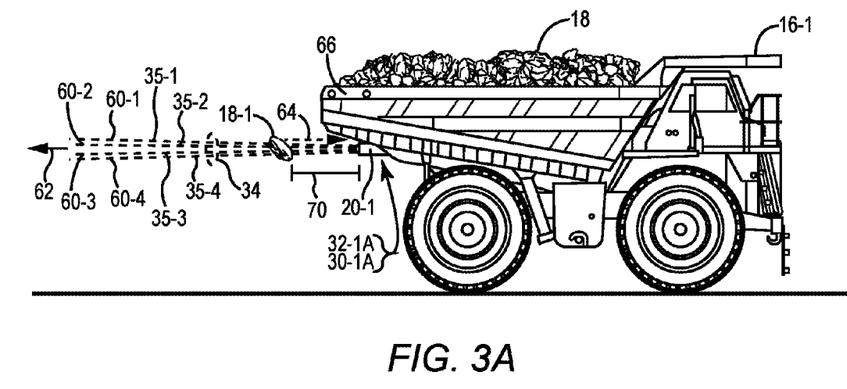
FIGS. 3A-3D are diagrams illustrating the detection of the material falling off the ground vehicle according to one embodiment.
Figure 3B:
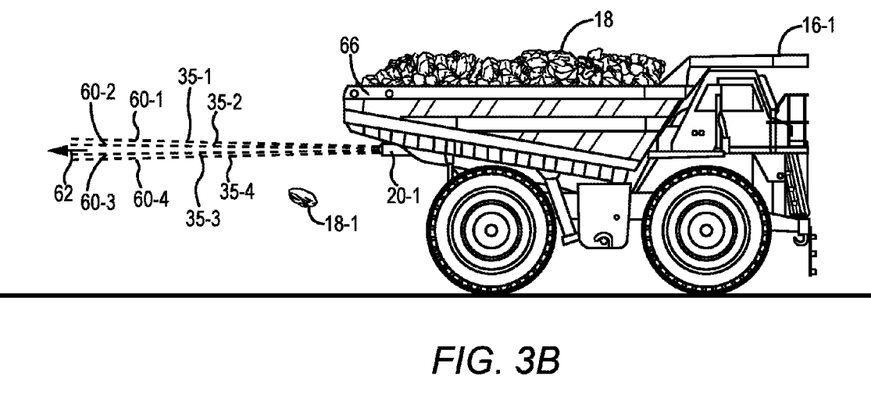
Figure 3C:
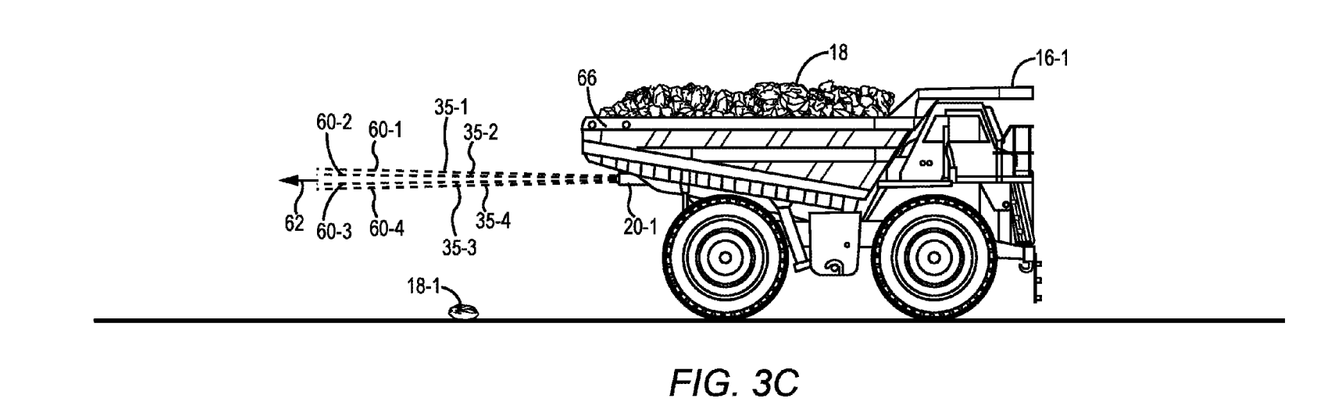
Figure 3D:
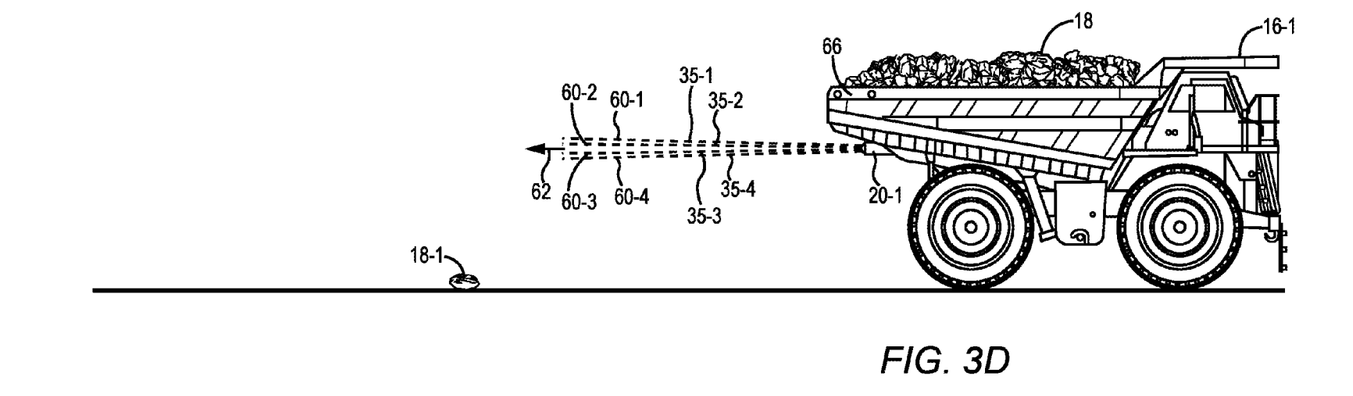

If the material 18-1 is above the predetermined threshold, the processing device 28 may obtain a current location of the ground vehicle 16-1 from the location determination system 27-1. Alternatively, in some embodiments, the material detection system 20-1 may have its own location determination system, such as a global positioning system. Based on the current location of the ground vehicle 16-1 and a calculated offset from the ground vehicle 16-1 to the material 18-1, the processing device 28 determines the location 42 of the material 18-1, and causes the location 42 of the material 18-1 to be communicated to the computing device 44. FIGS. 3B-3D depict the continuation of travel of the ground vehicle 16-1 after the material 18-1 has been detected.

FIGS. 4A-4D are diagrams illustrating the detection of the material 18-1 falling off the ground vehicle 16-1 according to another embodiment. FIGS. 4A-4D will be discussed in conjunction with FIG. 1. FIGS. 4A-4D depict four consecutive instances in time, and will be discussed together collectively, and in conjunction with FIG. 1.

In this embodiment, the material detection system 20-1 includes the first RDS 30-1A that includes four first EMR emitters 32-1A, similar to those illustrated above with regard to FIGS. 3A-3D. The plurality of first EMR emitters 32-1A are configured to emit the first EMR 34 in the form of a plurality of laser beams 67-1-67-4 on a plurality of different planes 61-1-61-4 (generally, planes 61) behind the ground vehicle 16-1, the plurality of different planes 61 being directed toward the road 14 rather than being directed substantially parallel to the earth as illustrated in FIGS. 3A-3D. In one embodiment, the planes 61 are directed at an angle 68 between about 30 degrees and about 75 degrees with respect to a line 71 perpendicular to the road 14. The planes 61 and the laser beams 67-1-67-4 are depicted by four separate dashed lines in FIGS. 4A-4D. The material detection system 20-1 may also include four first EMR receivers 38-1A configured to detect the first EMR reflections 64 of the first EMR 34. In other embodiments, a single first EMR receiver 38-1A may be configured to detect the first EMR reflections 64 of the first EMR 34.

Figure 4A:
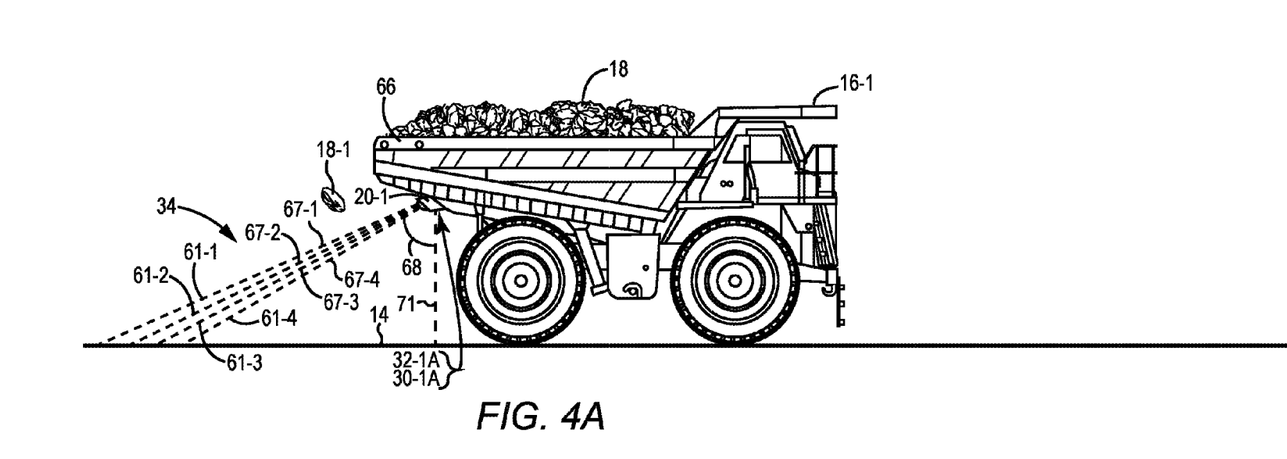
FIGS. 4A-4D are diagrams illustrating the detection of the material falling off the ground vehicle according to another embodiment.
Figure 4B:
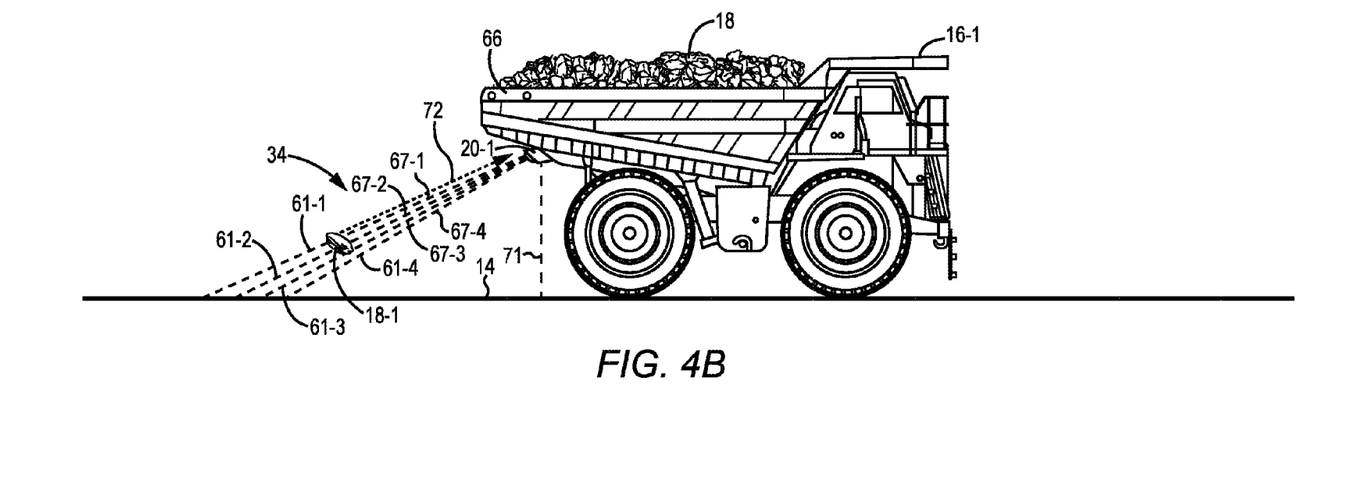

In this example, FIG. 4A illustrates the material 18-1 falling from the bed 66 of the ground vehicle 16-1. FIG. 4B illustrates a subsequent point in time as the material 18-1 initially impinges upon the first EMR 34 prior to contacting the road 14. The first RDS 30-1A may detect this initial impingement due to EMR reflections 72. The first RDS 30-1A may quantify the size of the material 18-1, and/or set an indicator that indicates that the material 18-1 may be detected again as the ground vehicle 16-1 continues travelling and the EMR 34 again impinges on the material 18-1 after the material 18-1 rests on the road 14. In some embodiments, the first RDS 30-1A may ignore this initial impingement.

Figure 4C:
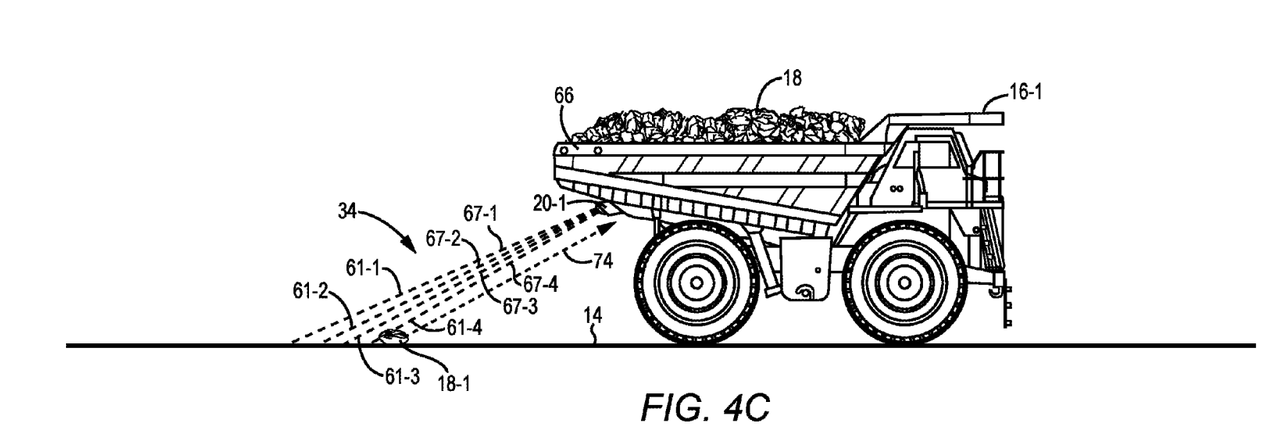
Figure 4D:
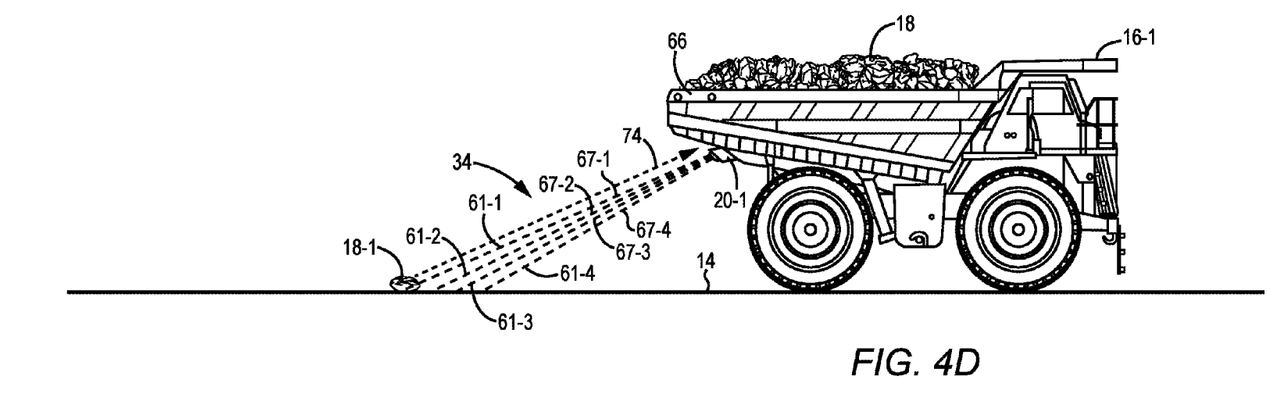

FIG. 4C illustrates the laser beam 67-4 impinging on the material 18-1 as the material 18-1 lies on the road 14. Based on EMR reflections 74, the material detection system 20-1 determines a size of the material 18-1. As the ground vehicle 16-1 continues travelling, each of the laser beams 67-3, 67-2 and 67-1 also impinge upon the material 18-1. FIG. 4D illustrates the laser beam 67-1 impinging on the material 18-1.

As discussed above with regard to FIGS. 3A-3D, based on the first RDS data received from the first RDS processing device 40-1A, the processing device 28 may determine that the material 18-1 on the road 14 is above a predetermined threshold, and may obtain a current location of the ground vehicle 16-1 from the location determination system 27-1. Based on the current location of the ground vehicle 16-1, the processing device 28 determines the location 42 of the material 18-1, and causes the location 42 of the material 18-1 to be communicated to the computing device 44.

Figure 5A:
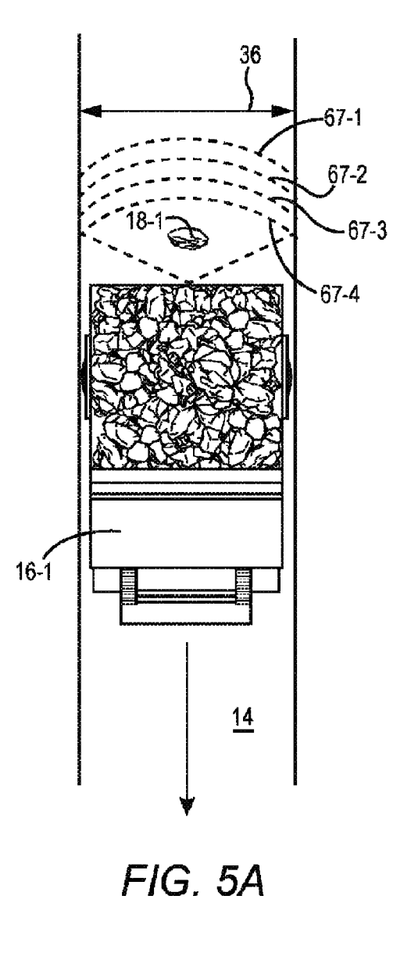
FIGS. 5A-5C are diagrams that illustrate a plan view of the embodiment illustrated in FIGS. 4A-4D.
Figure 5B:
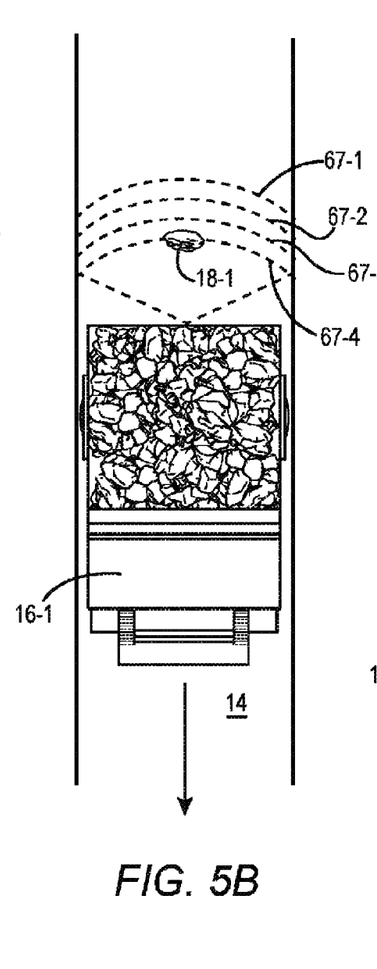
Figure 5C:
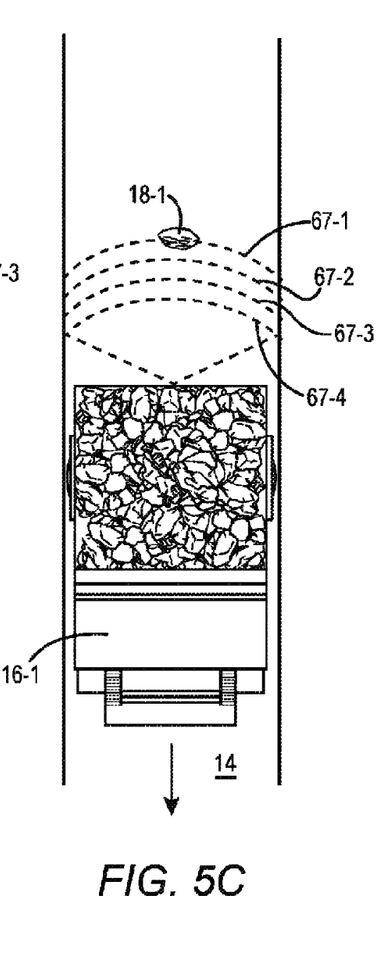

FIGS. 5A-5C are diagrams that illustrate a plan view of the embodiment illustrated in FIGS. 4A-4D. FIG. 5A illustrates the material 18-1 lying on the road 14 at a point in time prior to the laser beam 35-4 impinging on the material 18-1. FIG. 5B illustrates the material 18-1 lying on the road 14 at a point in time when the laser beam 35-4 impinges on the material 18-1. Based on the first RDS data received from the first RDS 30-1 which provides distances between the first EMR emitter 32-1A and reflective surfaces impinged by the laser beam 35-4, the processing device 28 detects the material 18-1. FIG. 5C illustrates the material 18-1 lying on the road 14 at a point in time when the laser beam 35-1 impinges on the material 18-1. Thus, the processing device 28 may, in this example, detect the material 18-1 four times based on EMR reflections from the laser beams 35-4-35-1.

FIGS. 6A-6D are diagrams illustrating the detection of the material 18-1 falling off the ground vehicle 16-1 according to yet another embodiment. In this embodiment, the material detection system 20-1 includes a first RDS 30-1A that includes the plurality of first EMR emitters 32-1A. The plurality of first EMR emitters 32-1A are configured to emit the first EMR 34 in the form of the plurality of laser beams 35-1-35-4 on a plurality of different planes 60-1-60-4 (generally, planes 60) behind the ground vehicle 16-1, the plurality of different planes 60 being parallel to or slightly offset from a central plane 62 that is substantially parallel to the earth, similar to that discussed and illustrated above with regard to FIGS. 3A-3D. The material detection system 20-1 also includes the second RDS 30-1B that includes the plurality of second EMR emitters 32-1B. In this embodiment, the plurality of second EMR emitters 32-1B are configured to emit the second EMR 34 in the form of a plurality of laser beams 67-1-67-4 on a plurality of different planes 61-1-61-4 (generally, planes 61) behind the ground vehicle 16-1, the plurality of different planes 61 being directed toward the road 14, similar to that discussed and illustrated above with regard to FIGS. 4A-4D. In one embodiment, the planes 61 are directed at an angle between about 30 degrees and about 60 degrees with respect to a line perpendicular to the road 14.

Figure 6A:
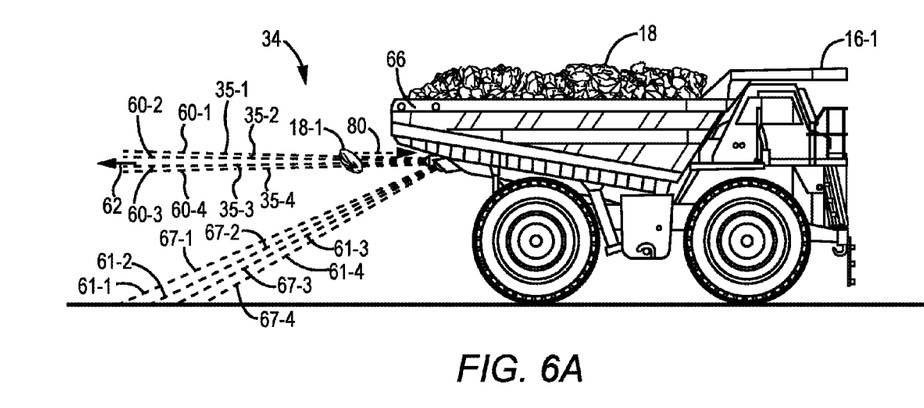
FIGS. 6A-6D are diagrams illustrating the detection of the material falling off the ground vehicle according to yet another embodiment.

In this example, the material 18-1 has fallen from the bed 66 of the ground vehicle 16-1. As the material 18-1 impinges upon the laser beams 35, first EMR reflections 80 are received by the first EMR receiver 38-1A. The first RDS processing device 40-1A provides RDS data that identifies one or more distances 70 to the processing device 28. Because the distances 70 are indicative of an object relatively close behind the ground vehicle 16-1, and because the relatively close distances 70 occur for only a brief period time during which the material 18-1 passes through the laser beams 35, the processing device 28 may determine that the first EMR reflections 80 identify material 18 that has fallen from the bed 66 of the ground vehicle 16-1. In this embodiment, since there is both a first RDS 30-1A and a second RDS 30-1B, the processing device 28 may set an indicator that indicates material 18 has fallen from the bed 66 and that the RDS data from the RDS processing device 40-1B should be analyzed to determine whether the material 18 is above a predetermined threshold that may damage tires.

Thus, in one embodiment, the initial detection of the material 18-1 due to the first RDS 30-1A may act as a trigger to analyze the RDS data provided by the second RDS 30-1B. In other embodiments, the initial detection of the material 18-1 due to the first RDS 30-1A is not a trigger, but merely additional data that may be used by the processing device 28.

In some instances, a unitary piece of material 18-1 may fall through the laser beams 35, hit the road 14, and roll off the road 14. In such situations, the processing device 28 can analyze the RDS data provided by the second RDS 30-1B and determine that the material 18-1 no longer poses a threat to other ground vehicles 16. In other instances, a unitary piece of material 18-1 may fall through the laser beams 35, hit the road 14, and break up into small pieces of material 18. Again, in such situations, the processing device 28 can analyze the RDS data provided by the second RDS 30-1B and determine that the material 18-1 no longer poses a threat to other ground vehicles 16, because the size of the pieces are below the predetermined threshold.

Figure 6B:
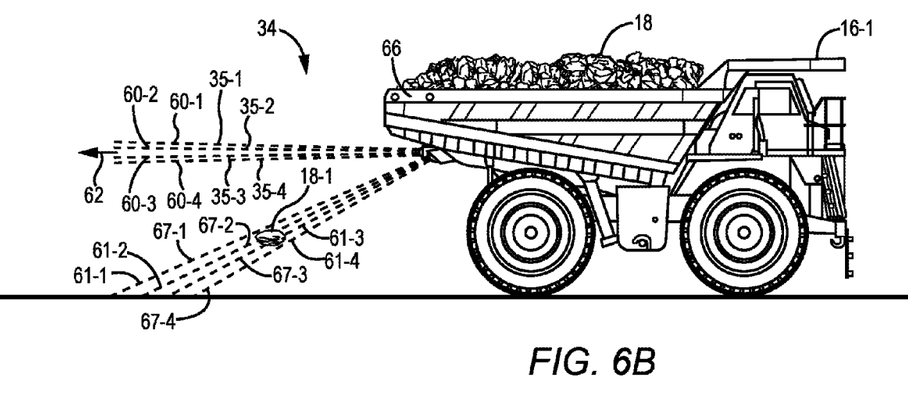
Figure 6C:
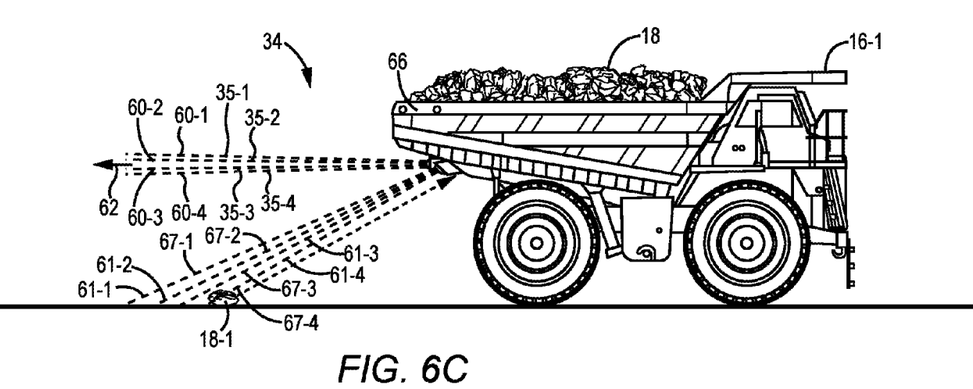

FIG. 6B illustrates the material 18-1 being impinged upon by the laser beams 67. In this example, the processing device 28 may ignore this detection because the material 18-1 was already detected when the material 18-1 passed through the laser beams 35. FIG. 6C illustrates the material 18-1 being impinged upon by the laser beam 67-4. Based on the RDS data returned by the second RDS 30-1B, the processing device 28 may determine that the material 18-1 exceeds the predetermined threshold. The processing device 28, however, may wait for the RDS data associated with the laser beams 67-1-67-3 prior to communicating the location to the computing device 44.

Figure 6D:
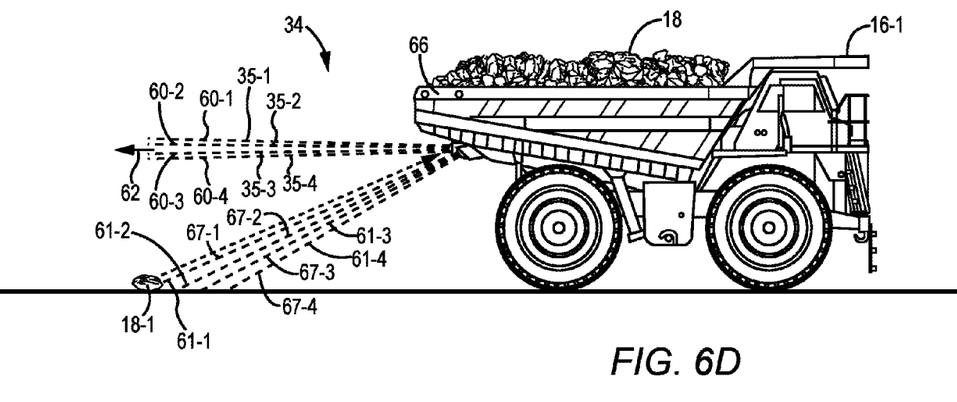

FIG. 6D illustrates the material 18-1 being impinged upon by the laser beam 76-1. Based on the RDS data returned by the second range determination system 30-1B, the processing device 28 may confirm that the material 18-1 exceeds a predetermined threshold. The processing device 28 may then obtain a current location of the ground vehicle 16-1 from the location determination system 27-1. Based on the current location of the ground vehicle 16-1, the processing device 28 determines the location 42 of the material 18-1 and causes the location 42 of the material 18-1 to be communicated to the computing device 44.

Figure 7A:
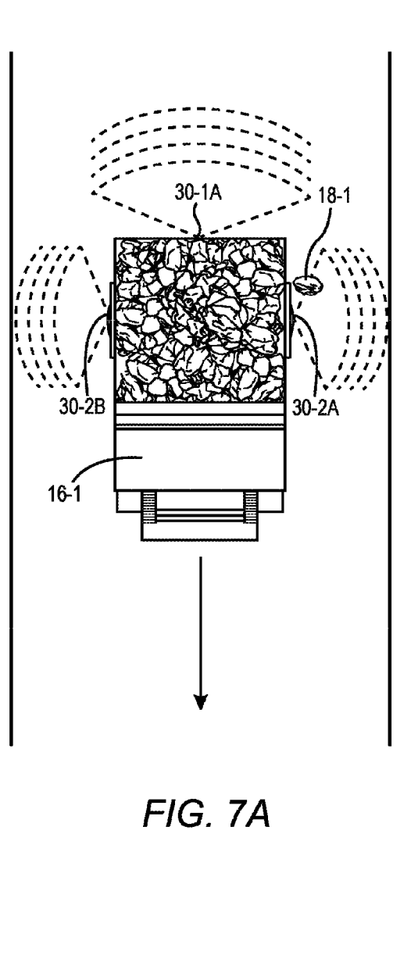
FIGS. 7A-7C are diagrams illustrating the detection of the material falling off the ground vehicle according to another embodiment.
Figure 7B:
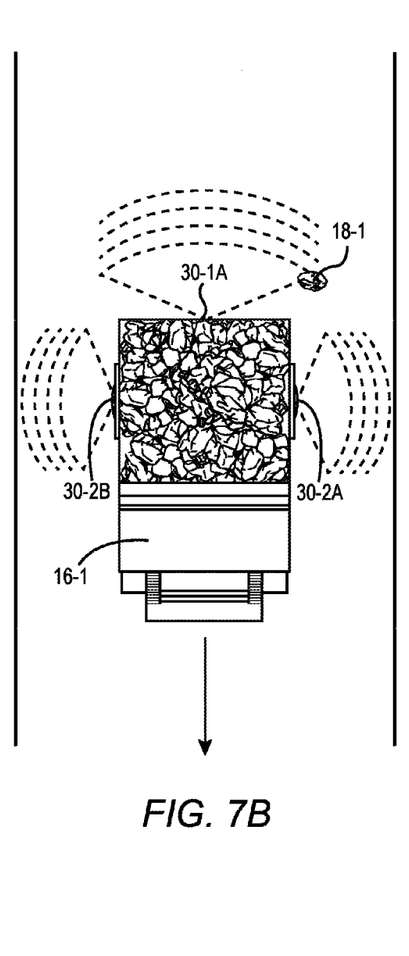
Figure 7C:
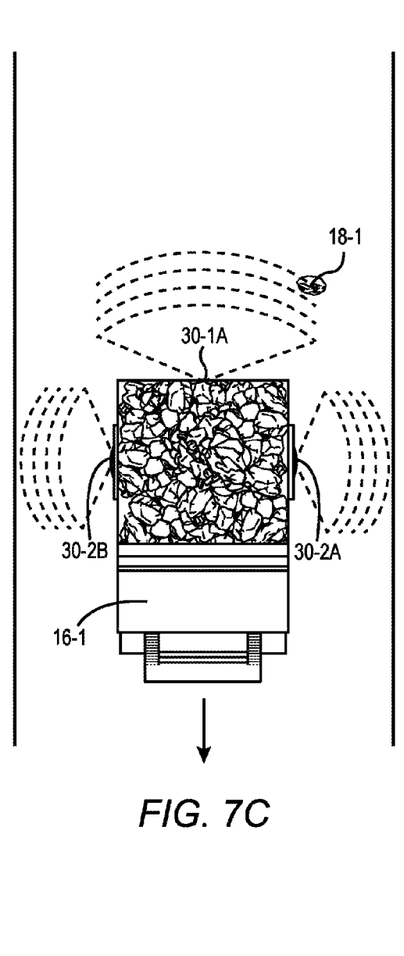

FIGS. 7A-7C are diagrams illustrating the detection of material 18-1 falling off the ground vehicle 16-1 according to another embodiment. Referring first to FIG. 7A, in this embodiment the ground vehicle 16-1 includes a pair of side-facing RDSs 30-2A, 30-2B that are directed in side directions with respect to the ground vehicle 16-1. The side directions may include directions that are perpendicular with respect to a direction of travel of the ground vehicle 16-1. The side-facing RDSs 30-2A, 30-2B may comprise horizontally directed EMR emitters 32 as illustrated in FIGS. 3A-3D, downward directed EMR emitters 32 as illustrated in FIGS. 4A-4D, or a combination of both, as illustrated in FIGS. 6A-6D. Assume that the material 18-1 falls off the side of the ground vehicle 16-1. The material 18-1 is detected by the RDS 30-2A in a manner as discussed above, which may, in some embodiments, be used as a first indication by the material detection system 20-1 that material larger than the predetermined threshold may lie on the road. FIGS. 7B, 7C illustrate the downwardly directed rear-facing RDS 30-1A detecting the material 18-1 as the material 18-1 lies on the ground. Processing may then continue as discussed above to provide notification to the computing device 44 regarding a location of the material 18-1, if appropriate.

Those skilled in the art will recognize improvements and modifications to the preferred embodiments of the disclosure. All such improvements and modifications are considered within the scope of the concepts disclosed herein and the claims that follow.

What is claimed is:

1. A material detection system mountable to a ground vehicle comprising:
   a first range determination system (RDS) comprising:
      a first electromagnetic radiation (EMR) emitter that is configured to emit a first EMR substantially parallel to the earth behind the ground vehicle within a first field of view (FOV);
      a first EMR receiver configured to receive first EMR reflections of the first EMR; and
      a first RDS processing device configured to generate first RDS data that identifies distances to reflective surfaces within the first FOV based on the first EMR reflections;
   a second RDS comprising:
      a second EMR emitter that is configured to emit a second EMR downwardly angled toward the earth behind the ground vehicle within a second FOV;
      a second EMR receiver configured to receive second EMR reflections of the second EMR; and
      a second RDS processing device configured to generate second RDS data that identifies distances to reflective surfaces based on the second EMR reflections; and
   a processing device coupled to the first RDS and the second RDS and configured to:
      determine, based at least in part on the first RDS data, that material has fallen off the ground vehicle;
      analyze the second RDS data upon initial detection of the material by the first RDS;
      determine, based at least in part on the second RDS data, that the material exists on a road;
      determine a location of the material; and
      cause the location of the material to be communicated to a computing device that maintains a map that identifies locations of material larger than a predetermined threshold.

2. The material detection system of claim 1, wherein the first RDS comprises a plurality of first EMR emitters including the first EMR emitter, and the plurality of first EMR emitters are configured to emit EMR in a plurality of different planes, the plurality of different planes centered about a central plane that is substantially parallel to the earth.

3. The material detection system of claim 1, wherein the second EMR is emitted at an angle between about 30 degrees and about 60 degrees with respect to a line perpendicular to the road.

4. The material detection system of claim 1, wherein the second RDS comprises a plurality of second EMR emitters including the second EMR emitter, and the plurality of second EMR emitters are configured to emit EMR in a plurality of different planes.

5. The material detection system of claim 1, wherein to determine the location of the material the processing device is further configured to:
   receive, from a location determination system, a location of the ground vehicle to which the material detection system is mounted;
   determine a velocity of the ground vehicle; and
   determine the location of the material based at least in part on the location of the ground vehicle and the velocity of the ground vehicle.

6. The material detection system of claim 1, wherein the first RDS comprises a light detection and ranging (LIDAR) system or a radio detection and ranging (RADAR) system.

7. The material detection system of claim 1, further comprising a wireless transceiver, and wherein to cause the location of the material to be communicated to the computing device that maintains the map, the processing device is further configured to cause the wireless transceiver to wirelessly transmit the location of the material to the computing device that maintains the map.

8. The material detection system of claim 1, wherein the processing device is further configured to determine, based on the first RDS data, that the material is larger than the predetermined threshold.

9. The material detection system of claim 1, further comprising:
   a third RDS comprising:
      a third EMR emitter that is configured to emit a third EMR in a first side direction within a third FOV;
      a third EMR receiver configured to receive third EMR reflections of the third EMR; and
      a third RDS processing device configured to generate third RDS data that identifies distances to reflective surfaces within the third FOV based on the third EMR reflections.

10. The material detection system of claim 9, further comprising:
    a fourth RDS comprising:
       a fourth EMR emitter that is configured to emit a fourth EMR in a second side direction;
       a fourth EMR receiver configured to receive fourth EMR reflections of the fourth EMR; and
       a fourth RDS processing device configured to generate fourth RDS data that identifies distances to reflective surfaces within a fourth FOV based on the fourth EMR reflections.

11. A ground vehicle comprising:
    a material detection system mountable to a ground vehicle comprising:
       a first range determination system (RDS) comprising:
          a first electromagnetic radiation (EMR) emitter that is configured to emit a first EMR substantially parallel to the earth behind the ground vehicle within a first field of view (FOV);
          a first EMR receiver configured to receive first EMR reflections of the first EMR; and
          a first RDS processing device configured to generate first RDS data that identifies distances to reflective surfaces within the first FOV based on the first EMR reflections;
       a second RDS comprising:
          a second EMR emitter that is configured to emit a second EMR downwardly angled toward the earth behind the ground vehicle within a second FOV;
          a second EMR receiver configured to receive second EMR reflections of the second EMR; and
          a second RDS processing device configured to generate second RDS data that identifies distances to reflective surfaces based on the second EMR reflections; and
       a processing device coupled to the first RDS and the second RDS and configured to:
          determine, based at least in part on the first RDS data, that material has fallen off the ground vehicle;
          analyze the second RDS data upon initial detection of the material by the first RDS;
          determine, based at least in part on the second RDS data, that the material exists on a road;
          determine a location of the material; and cause the location of the material to be communicated to a computing device that maintains a map that identifies locations of material larger than a predetermined threshold.

12. The ground vehicle of claim 11, further comprising:
a location determination system; and
wherein to determine the location of the material on the earth, the processing device is further configured to:
determine a location of the ground vehicle via the location determination system;
determine a velocity of the ground vehicle along the road; and
determine the location of the material based at least in part on the location of the ground vehicle and the velocity of the ground vehicle.

13. The ground vehicle of claim 11, wherein the ground vehicle is a self-driving ground vehicle, and further comprising:
a vehicle navigation system, the vehicle navigation system configured to:
receive, from the computing device, the map;
determine, based on the map, that the material is in the road; and
determine a new path that avoids the material.

14. A method comprising:
emitting first electromagnetic radiation (EMR) within a first field of view (FOV) substantially parallel to the earth behind a ground vehicle;
receiving first EMR reflections of the first EMR;
generating first range detection system (RDS) data that identifies distances to reflective surfaces within the first FOV based on the first EMR reflections;
determining by a processing device, based at least in part on the first RDS data, that material has fallen off the ground vehicle;
emitting second EMR within a second FOV that is downwardly angled toward the earth behind the ground vehicle;
receiving second EMR reflections of the second EMR;
generating second RDS data that identifies distances to reflective surfaces within the second FOV based on the second EMR reflections;
analyzing by the processing device the second RDS data upon initial detection of the material based at least in part on the first RDS data;
determining by the processing device, based at least in part on the second RDS data, that the material exists on a road;
determining by the processing device a location of the material; and
causing by the processing device the location of the material to be communicated to a computing device that maintains a map that identifies locations of material larger than a predetermined threshold.

15. The method of claim 14, wherein causing the location of the material to be communicated to the computing device comprises wirelessly transmitting the location of the material to the computing device.

16. The material detection system of claim 1, wherein the processing device is further configured to determine, based on the second RDS data, that the material on the road is larger than the predetermined threshold.

17. The material detection system of claim 1, wherein the processing device is configured to determine a location of the material based on the first RDS data or the second RDS data.

18. The material detection system of claim 1, wherein:
the processing device is further configured to determine, based on the second RDS data, that the material on the road is larger than the predetermined threshold; and
the processing device is configured to determine a location of the material based on the first RDS data or the second RDS data.

19. The ground vehicle of claim 11, wherein:
the processing device is further configured to determine, based on the second RDS data, that the material on the road is larger than the predetermined threshold; and
the processing device is configured to determine a location of the material based on the first RDS data or the second RDS data.

20. The method of claim 14,
further comprising determining by the processing device, based on the second RDS data, that the material on the road is larger than the predetermined threshold; and
wherein determining by the processing device a location of the material is based on the first RDS data or the second RDS data.

* * * * *